US00RE38397E

(19) United States
(12) Reissued Patent
Gueret

(10) Patent Number: US RE38,397 E
(45) Date of Reissued Patent: Jan. 27, 2004

(54) BRUSH FOR APPLYING A COSMETIC PRODUCT AND MAKE-UP DEVICE COMPRISING IT

(75) Inventor: Jean-Louis H. Gueret, Paris (FR)

(73) Assignee: L'Oreal, Paris (FR)

(21) Appl. No.: 09/867,646

(22) Filed: May 31, 2001

Related U.S. Patent Documents

Reissue of:
(64) Patent No.: 5,934,292
Issued: Aug. 10, 1999
Appl. No.: 08/969,830
Filed: Nov. 13, 1997

(30) Foreign Application Priority Data

Nov. 13, 1996 (FR) ..... 96 13819

(51) Int. Cl.[7] ..... A45D 40/26
(52) U.S. Cl. ..... 132/218; 132/320
(58) Field of Search ..... 132/218, 216, 132/217, 313, 320; 15/206, DIG. 5

(56) References Cited

U.S. PATENT DOCUMENTS

| | | | |
|---|---|---|---|
| 565,328 | A | 8/1896 | Buhler |
| 1,806,520 | A | 5/1931 | Cave |
| 1,962,854 | A | 6/1934 | Anderson |

(List continued on next page.)

FOREIGN PATENT DOCUMENTS

| | | |
|---|---|---|
| DE | 42 05 935 | 9/1993 |
| EP | 0 511 842 | 11/1992 |
| EP | 0 663 161 | 7/1995 |
| FR | 726 157 | 5/1932 |
| FR | 2 285 101 | 4/1976 |
| FR | 2 505 633 | 11/1982 |
| FR | 2 605 505 | 4/1988 |
| FR | 2 678 494 | 1/1993 |
| FR | 2 701 198 | 8/1994 |
| FR | 2 715 038 | 7/1995 |
| FR | 2 730 910 | 8/1996 |
| FR | 2 730 911 | 8/1996 |
| FR | 2 745 272 | 8/1997 |
| GB | 1 335 322 | 10/1973 |
| GB | 2 146 520 | 4/1985 |
| GB | 2 170 996 | 8/1986 |
| GB | 2 714 895 | 11/1986 |
| JP | 56-91507 | 12/1954 |
| JP | 58-88912 | 6/1983 |
| JP | 63-111808 | 5/1988 |
| JP | 5-88410 | 12/1993 |
| JP | 6-237818 | 8/1994 |
| JP | 8-33518 | 2/1996 |
| WO | WO 93/16617 | 9/1993 |
| WO | WO 96/29905 | 10/1996 |

OTHER PUBLICATIONS

English language Derwent Abstract of FR 285 101, Apr. 16, 1976.

English language Derwent Abstract of FR 2 678 494, Jan. 8, 1993.

Co–pending Reissue Application No. 09/745,255; Title: Progressive Brush For Applying A Cosmetic Product Inventor(s): Jean–Louis H. Gueret U.S. Filing Date: Dec. 22, 2000.

(List continued on next page.)

*Primary Examiner*—Eduardo C. Robert
(74) *Attorney, Agent, or Firm*—Finnegan, Henderson, Farabow, Garrett & Dunner, L.L.P.

(57) ABSTRACT

A brush comprises a wand defining a major axis, a flexible core which defines the length of the brush, the core having a first end and a second end, the first end being secured to the wand. Bristles are inserted radially into the core, the ends of the bristles defining an envelope surface of the brush, the envelope surface having a first end and a second end. The core describes a curve in a plane of curvature, and the envelope surface of the brush, over a least part of its length has a cross section of elongate shape in the direction of an axis of greatest length parallel to the plane of curvature.

205 Claims, 7 Drawing Sheets

U.S. PATENT DOCUMENTS

| | | | |
|---|---|---|---|
| 2,448,603 | A | 9/1948 | Kevin et al. |
| 3,033,213 | A | 5/1962 | Joss et al. |
| 3,214,782 | A | 11/1965 | Masters et al. |
| 3,469,928 | A | 9/1969 | Widegren |
| 3,908,675 | A | 9/1975 | Spatz et al. |
| 3,908,676 | A | 9/1975 | Levine et al. |
| 3,921,650 | A | 11/1975 | Montgomery |
| 4,365,642 | A | 12/1982 | Costa |
| 4,403,624 | A | 9/1983 | Montgomery |
| 4,458,701 | A | 7/1984 | Holland |
| 4,461,312 | A | 7/1984 | Gueret |
| 4,527,575 | A | 7/1985 | Vasas |
| 4,545,393 | A | 10/1985 | Gueret et al. |
| 4,561,456 | A | 12/1985 | Gueret |
| 4,586,520 | A | 5/1986 | Brittain |
| 4,635,659 | A | 1/1987 | Spatz |
| 4,662,385 | A | 5/1987 | Schefer |
| 4,784,505 | A | 11/1988 | Dahm |
| 4,804,004 | A | 2/1989 | Taylor |
| 4,810,122 | A | 3/1989 | Cole |
| 4,887,622 | A | 12/1989 | Gueret |
| 4,898,193 | A | 2/1990 | Gueret |
| 4,921,366 | A | 5/1990 | Hurrell |
| 4,927,281 | A | 5/1990 | Gueret |
| 4,993,440 | A | 2/1991 | Gueret |
| 5,094,254 | A | 3/1992 | Krueckel et al. |
| 5,137,038 | A | 8/1992 | Kingsford |
| 5,197,497 | A | 3/1993 | Gueret |
| 5,224,787 | A | 7/1993 | Vasas |
| 5,238,011 | A | 8/1993 | Gueret |
| 5,339,841 | A | 8/1994 | Gueret |
| 5,345,644 | A | 9/1994 | Gueret |
| 5,357,987 | A | 10/1994 | Schrepf |
| 5,418,999 | A | 5/1995 | Smith |
| 5,482,059 | A | 1/1996 | Miraglia |
| 5,542,439 | A | 8/1996 | Gueret |
| 5,551,456 | A | 9/1996 | Hartel |
| 5,595,198 | A | 1/1997 | Kemmerer |
| 5,613,258 | A | 3/1997 | Hilfinger et al. |
| 5,709,230 | A | 1/1998 | Miraglia |
| 5,722,436 | A | 3/1998 | Vandromme et al. |
| 5,803,638 | A | 9/1998 | Gueret |
| 5,853,011 | A | 12/1998 | Gueret |
| 5,860,432 | A | 1/1999 | Gueret |
| 5,876,138 | A | 3/1999 | Gueret |
| 5,894,847 | A | 4/1999 | Gueret |
| 5,937,870 | A | 8/1999 | Gueret |
| 6,067,997 | A | 5/2000 | Gueret |
| 6,076,531 | A | 6/2000 | Gueret |
| 6,076,985 | A | 6/2000 | Gueret |
| 6,099,183 | A | 8/2000 | Gueret |

OTHER PUBLICATIONS

Co–pending Reissue Application No. 09/761,701, Title: Brush Having A Plano–Concave Profile Inventor(s): Jean–Louis H. Gueret U.S. Filing Date: Jan. 18, 2001.

Co–pending Reissue Application No. 09/773,946; Title: Brush Having Plano–Convex Profile, Inventor(s): Jean–Louis H. Gueret, U.S. Filing Date: Feb. 2, 2001.

BRUSH FOR APPLYING A COSMETIC PRODUCT AND MAKE-UP DEVICE COMPRISING IT

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a brush, particularly a brush for applying a cosmetic product to keratinous fibers, especially for applying mascara to the eyelashes to a dye to the hair, and to a make-up device comprising the brush; the brush has a curved core.

2. Description of the Preferred Embodiment

A brush for applying a cosmetic product customarily comprises an elongate core, formed by a helical twist of two branches of a metal wire which has been bent into a U before the branches were twisted, and bristles inserted radially into this core and gripped between these twisted branches. Such brushes may be of various shapes and have cutouts.

When these brushes are used to apply mascara to the eyelashes, such shapes and such cutouts are designed to make it possible to obtain a heavier or lighter make-up effect, with varying amounts of lengthening and of curling of the eyelashes.

Brushes in the shape of a fragment of a torus are known, these brushes being obtained by twisting the core of a cylindrical brush into an arc of a circle. Such brushes have a convex face, a concave face, and two more or less flat faces. Such brushes are not very easy to handle because, if the user twists the wand of such a brush about its axis between her fingers in order for example to apply a product to here eyelashes, she has continually to correct the distance between the brush and the eyelashes. With these brushes it is difficult to apply make-up in the corner of the eye without overspill onto the eyelid and the side of the nose. Furthermore, it has been observed that such a brush tends to coat the eyelashes without spreading out the product very much and without separating the lashes very much. Brushes obtained by twisting the core of a cylindro-conical brush into a circular arc have the same drawbacks.

It has therefore become desirable to have available brushes that allow the eyelashes to be engaged fully by the brush in order to spread out the product correctly and to separate the lashes properly. Another object of the invention is to provide a brush which is still simple and economical to apply, and is practical to use.

SUMMARY OF THE INVENTION

The Applicant has unexpectedly discovered novel brushes for applying a cosmetic product which, when used to apply mascara to the eyelashes, make it possible to obtain a make-up effect with a great deal of separation, curling and lengthening and with a product spread out along the entire length of the lash. These brushes are moreover very easy to handle and allow make-up to be applied with ease to the corner of the eye.

A first aspect of the invention provides a brush comprising a wand defining a major axis (X—X); a core comprising a first end and a second end, the first end being secured to the wand: bristles inserted radially into this core, the ends of the bristles defining an envelope surface of the brush, this envelope surface having a first end and a second end, the brush being characterized in that the core describes a curve (C) in a plane of curvature (P); and in that the envelope surface of the brush, over at least part of its length, has a cross section of elongate shape in the direction of an axis (Z—Z) of greatest length parallel to the plane of curvature (P).

The cross section of the envelope surface is intended to mean a section through the envelope surface on a plane perpendicular to the core.

Preferably, the curve (C) is more or less circular. That side of the brush which is in the concave part of the curve (C) forms a first comb-line part. That side of the brush which is on the opposite side likewise forms a second comb-like part.

As the cross sections of the envelope surface of the brush are elongate in the direction of the axis of greatest length, in the direction parallel to the plane (P) of twisting of the core, the brush according to the invention has two broad flattened faces.

The first comb-like part, that is in the hollow of the brush, is very close in shape to the contour of the eyelashes. Furthermore, it contains long and therefore very flexible bristles, and these bristles converge. It can therefore engage the eyelashes along the entire width of the eyelid, lengthen them and curl them. As this comb-like part has a high density of bristles, it encourages the curling of the lash. The second comb-like part on the opposite side has less dense and more spaced cut bristles since they diverge. This second comb-like part can therefore comb the lashes more easily and spread the product over their entire length. The two comb-like parts are narrow compared with the faces of the brush. They can therefore penetrate well into the lashes in order to separate them over their entire length.

As the distance between the two faces is shorter than the width of the brush, the brush can slip easily into the corner of the eye to apply make-up to the eyelashes without overspill around the corner of the eye.

The two wide faces of the brush which have bristles which are shorter, and therefore less flexible than the bristles of the sides, allow very effective application of the product to the lashes.

The very pronounced and markedly differing characteristics of the faces and of the sides give this brush a surprising dynamic behavior when the user turns the brush between her fingers, the lashes are alternately coated and curled then combed out with uncustomary intensity.

Preferably the core is central with respect to each cross section.

In a first alternative form of the invention, provision may be made for the cross section to have at least two sides in the direction of the axis (Z—Z) of greatest length, these sides being more or less parallel to the axis (Z—Z).

In a second alternative form of the invention, provision may be made for the cross section to have at least two sides in the direction of the axis (Z—Z) of greatest length, these sides having a convex shape. According to this alternative form, provision may be made for the sides of the cross section to have two ends, the width of the section in the direction of the axis (Y—Y) perpendicular to the axis (Z—Z) of greatest length at one of these ends, or at both of these ends, being more or less zero.

With either of the alternative forms of the invention, it is preferable for the cross section to have at least two sides in the direction of the axis (Y—Y), this axis being perpendicular to the axis (Z—Z) of greatest length, these sides having a convex shape.

Advantageously, the cross section has a maximum width (D) in the direction of the axis (Z—Z) of greatest length and a maximum width (d) in the direction of the axis (Y—Y), D and d satisfying the relationship.

$D>1.5d$

More preferably still, D and d satisfy the relationship:

$D>2d$

The longer length can vary along the core. In order that the make-up characteristics described hereinabove are more pronounced, brushes are preferred in which the envelope surface has an elongate cross section over at least 50% and preferably at least 75% of its length.

Advantageously, the brushes according to the invention are designed in such a way that, for each cross section, the axis of greatest length and the axis of greatest width are perpendicular.

For greater ease of handling, the ends of the core are preferably aligned with the axis X—X.

A second aspect of the invention is a method of manufacturing a brush as described hereinabove, the method being characterized in that it comprises the following steps:

(i) producing a starting brush comprising a wand defining a major axis (X—X); and a core comprising a first end and a second end, the first end being secured to this wand, the core being straight and aligned with the wand, bristles being inserted radially into this core, the end of the bristles defining an envelope surface of the starting brush.

(ii) trimming the bristles of the starting brush in such a way that the envelope surface of the brush over at least part of its length has a cross section of elongate shape in the direction of an axis (Z—Z) of greatest length, and (iii) giving the core a main twist in the plane parallel to the axis (Z—Z) of greatest length and passing through the wand.

Preferably, in a fourth step;

(iv) a secondary twist is given to that end of the core which is secured to the wand in order to align the second end of the core with the main axis (X—X).

More preferably, steps (i) and (ii) are carried out in such a way that the core is central with respect to the faces of the straight trimmed brush.

Advantageously, the starting brush is trimmed in such a way that the envelope surface has an elongate cross section over at least 50% and preferably at least 75%, of its length.

In a preferred embodiment of the invention, step (iii) is carried out in such a way as to give the core a main twist which is more or less an arc of a circle.

Furthermore, the bristles of the brushes according to the invention may be of any kind: the bristles may be of different lengths, of different diameters or of different cross-sections, or of different materials; the bristles may have tapered ends or forked ends, or be shaped like a hairpin, or may have undergone any sort of treatment known to those skilled in the art.

The brush according to the invention may contain alternating rows of short bristles and of long bristles, only the long bristles being involved in defining the envelope surface of the brush. This alternative form of the brush of the invention makes it possible to accentuate the coating of the eyelash with product.

The starting brush may have been milled before being subjected to the method of the invention, in such a way that it has long scattered bristles which are not taken into account in defining the envelope surface of the starting brush.

The helical twisting of the two branches of metal wire that forms the core may be with a right-hand twist as is customary in the manufacture of make-up brushes, or with a left-hand twist, as per the teachings of FR-A-2701198. To manufacture a brush with a left-hand twist, the branches of the core are twisted by turning to the left to form turns that turn in the clockwise direction about the core in a direction from the wand towards the end of the brush.

A third aspect of the invention provides a make-up device comprising: a mascara reservoir and a mascara-applicator member according to the first aspect.

Owing to its special shape, when the brush passes through a wringing device, its sides are very well wrung out while its faces are wrung out to a lesser extent. In particular, the sides and the faces are wrung asymmetrically on account of their curvature. This special feature allows the user, depending on which of the faces is used, to apply make-up with a heaviness and intensity that can vary along the entire length of the eyelid.

The flexibility of the bristles, and the flexibility of the core, can be altered to encourage or discourage the wringing-out of the brush.

In order to make the subject-matter of the invention easier to understand, several brushes that have the characteristics of this invention will be described hereafter by way of example.

DETAILED DESCRIPTION OF THE PREFERRED EMBODIMENTS

Figure 1:
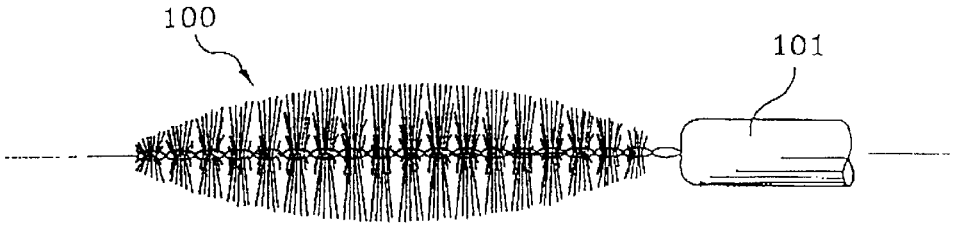
FIGS. 1, 1A, 2A and 3A are views in perspective of starting brushes that can be used to manufacture a brush according to the invention.
Figure 1A:
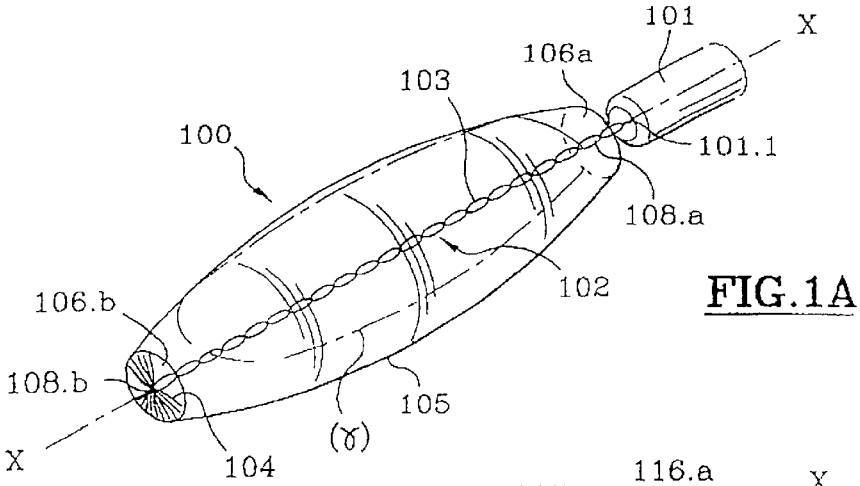

The brush 100 depicted in FIGS. 1 and 1A comprises a straight wand 101 defining a main axis X—X. Fixed by force-fitting to the end 101.1 of this wand 101 is a relatively flexible core 102 defining the length of the brush. This core (which has been depicted in these Figures even though it is inside the brush) is elongate and has been formed by the helical twisting of two branches of a length of metal wire 103 which has been bent into a U before the branches were twisted. The axis of the core 102 coincides with the main axis X—X. Bristles 104 are inserted radially between the branches of the wire 103. When the branches of the wire 103 are twisted, the bristles become clamped and held between the helical turns of the core 102. The ends of the bristles 104 define the surface 105 of the brush, this is a convex axisymmetric surface which has the shape of a rugby ball and the ends of which consist of two right cross sections: the disk 106.a with a center 108.a and the disk 106.b with a center 108.b.

Using a trimmer, two more or less flat parallel faces are cut in the brush of FIG. 1A over practically the entire length (measured alone the axis X—X) of the brush. Depicted in FIG. 1A is the intersection (Y1) between the surface 105 of the brush and the trimming plane. This yields a trimmed brush depicted in FIGS. 1B and 1C.

Figure 1B:
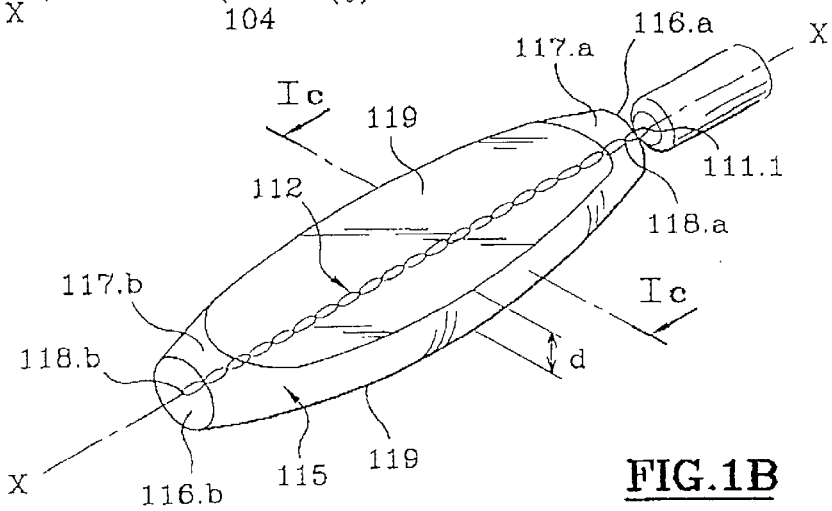
FIGS. 1B, 2B and 3B are views in perspective of brushes respectively according to 1A, 2A and 3A which have been trimmed in accordance step (ii) of the method according to the invention.
Figure 1C:
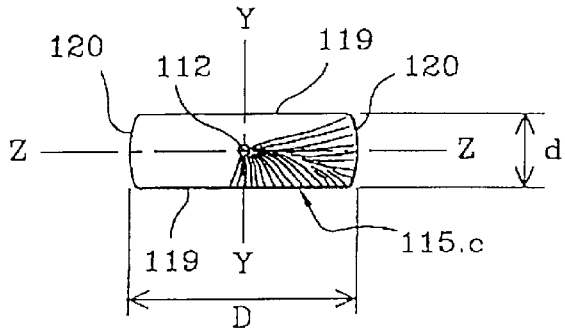
FIGS. 1C, 2C and 3C are sections on planes IC—IC, IIC—IIC and IIIC—IIIC of the brushes depicted in FIGS. 1B, 2B and 3B respectively.

For elements of FIGS. 1B and 1C which are common to those of FIG. 1A, the references in FIGS. 1B and 1C are the same as those in FIG. 1A, increased by 10.

The brush depicted in FIGS. 1B and 1C has two mutually parallel faces 119 which are also parallel to the axis X—X. These two faces are equidistant from the core 112. The distance between the two faces is d. The two faces are joined by rounded edges 120. In the region where the faces 119 have cutouts, the sections of the brush on a plane perpendicular to X—X consist of curves 115C depicted in FIG. 1C which are more or less rectangular, with a long length D in the direction of the axis Z—Z of greatest length and the greatest width d measured along the axis Y—Y of greatest width, with D>1.5d. The two faces do not extend as far as the ends 117a and 117b of the brush. At these ends, the sections 116a, 116b of the brush are circular. The curve 115C is symmetric with respect to the axis Z—Z of greatest length and the axis Y—Y of greatest width.

Using an appropriate tool, for example by pressing the core longitudinally around a metal cylinder, the core 112 is given a first twist in the plane parallel to the faces 119 between the sections 116.a and 116.b, in such a way that the core has more or less the shape of an arc of a circle; then it is given a second twist, in the same plane, between the end 111.1 of the wand and the center 118.a of the end section of the brush, so as to align the center 118.b of the other end of the brush with the main axis X—X, like the first end 118.a.

Figure 1D:
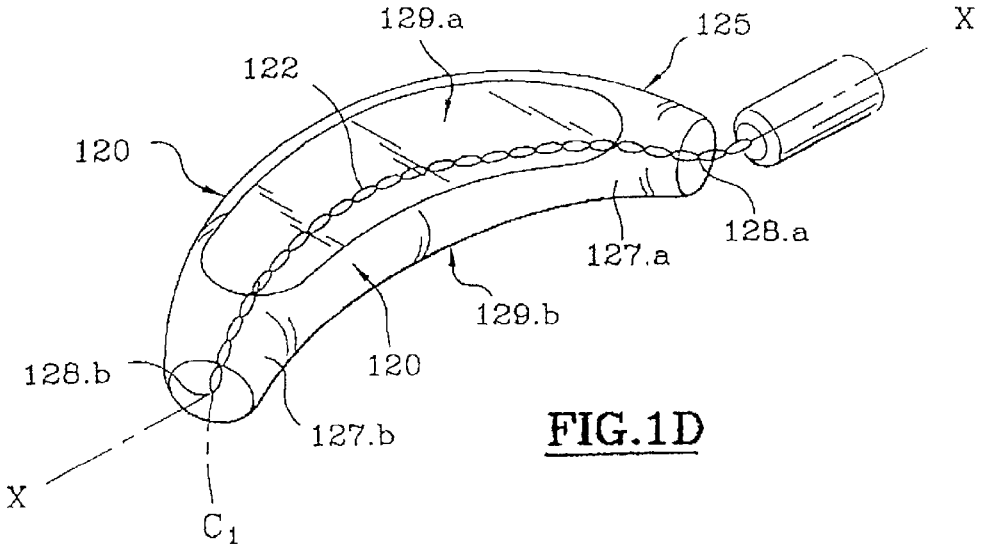
FIGS. 1D, 2D and 3D are perspective views of brushes according to the invention, manufactured in accordance with the method of the invention, from the starting brushes depicted in FIGS. 1A, 2A and 3A respectively.

This operation yields a brush 120 according to the invention and depicted in FIG. 1D. In this Figure, the references given to elements which are similar to those in FIGS. 1B and 1C are those of FIG. 1B and 1C increased by 10.

The brush in FIG. 1D is more or less in the shape of a sickle; the core 122 describes a curve C which is more or less an arc of a circle. However, its ends 128.a and 128.b are aligned with the main axis X—X. The brush comprises two faces 129a, 129b. These two faces are joined by rounded edges 120. The surface 125 of the brush is generated by a series of curves 115c, as depicted in FIG. 1C, which progress along the core 122, these curves are more or less rectangular, with their axes (Z—Z) of greatest length mutually parallel. At its ends 127a, 127b, the brush is generated by circular curves.

Figure 2A:
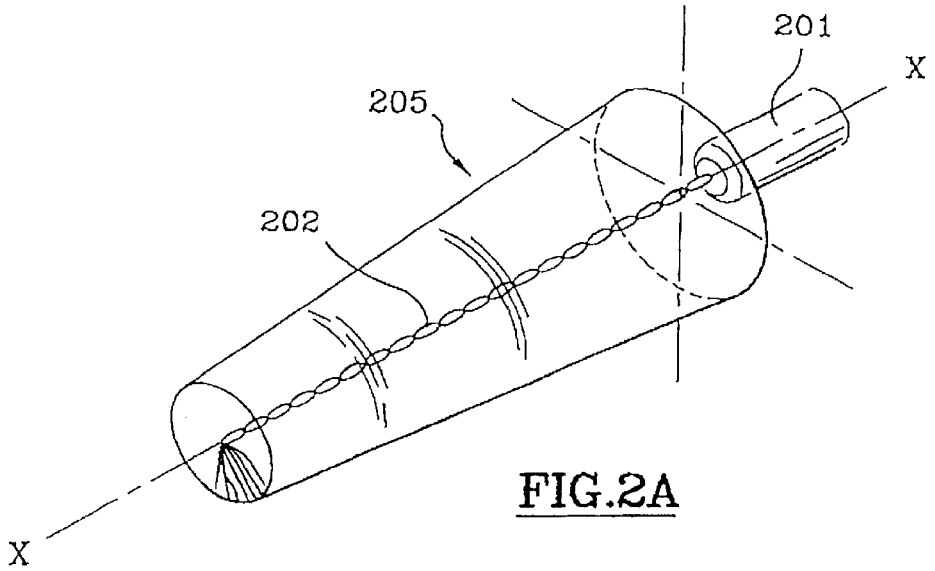

FIG. 2A can be differentiated from FIG. 1A by the fact that the surface 205 of the starting brush is in the shape of a cone frustum.

Using a trimmer two secant rounded faces are cut in the brush of FIG. 2A along the entire length (measured along the axis X—X) of the brush. This yields a trimmed brush depicted in FIGS. 2B and 2C.

Figure 2B:
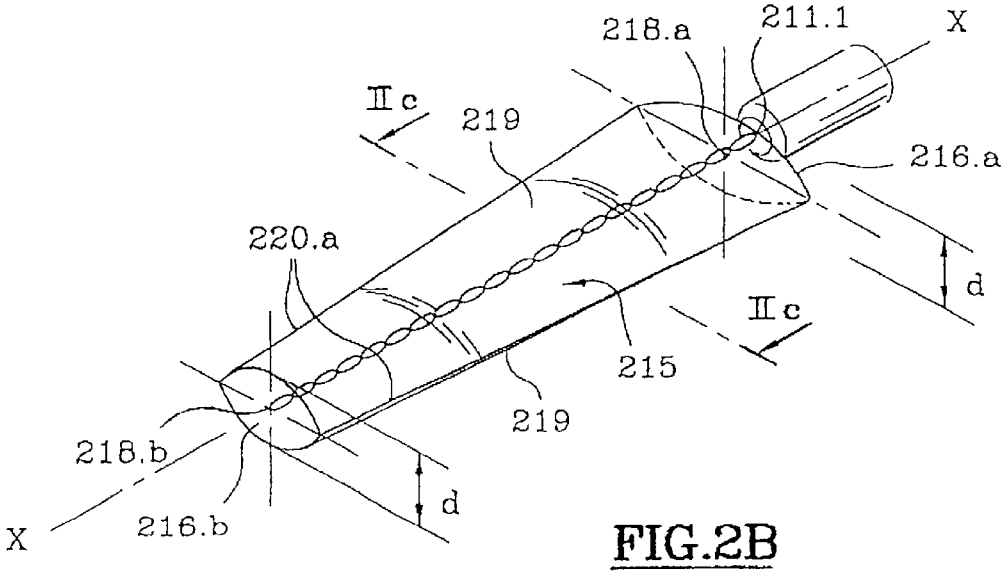
Figure 2C:
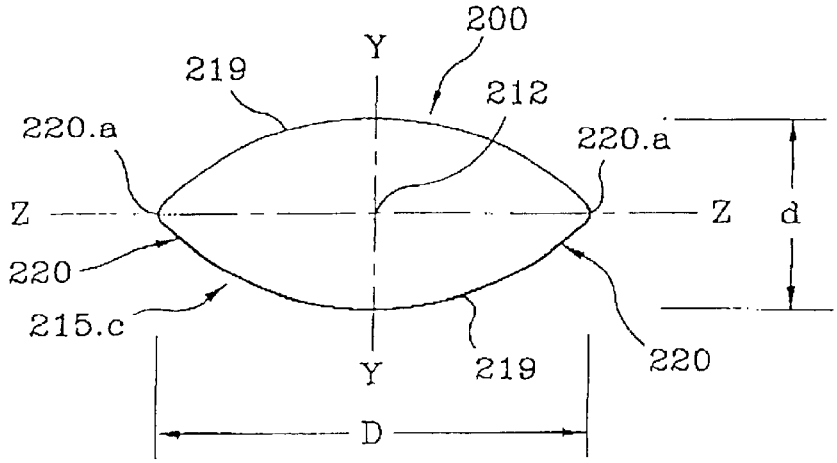

For elements of FIGS. 2B and 2C which are common to FIG. 2A, the references in FIGS. 2B and 2C are the same as those in FIG. 2A increased by 10.

The brush depicted in FIGS. 2B and 2C has two rounded and secant faces 219. These two faces are symmetric with respect to the core 212.

The distance d between the extremes of the two faces is more or less constant from one end of the brush to the other. The two faces are joined by edges 220 which end in ridges 220a. The cross-sections of the brush on a plane perpendicular to X—X consist of curves 215c depicted in FIG. 2C which are more or less eye-shaped, with the long length D along the axis Z—Z of greatest length and greatest width d measured along the axis Y—Y of greatest width. D increases from a first end 216b as far as a second end 216a with D>2d on the curve 215c depicted in FIG. 2C. The two trimmed faces extend as far as the end sections 216a and 216b of the brush. The curve 215c is symmetric with respect to the axis Z—Z of greatest length and the axis Y—Y of greatest width.

Using an appropriate tool, for example by pressing the core longitudinally around a metal cylinder, the core 212 is given a first twist in the plane parallel to the axis Z—Z and passing through the wand 211, between the sections 216.a and 216.b, in such a way that the core has more or less the shape of an arc of a circle; it is then given a second twist, in the same plane, between the end 211.1 of the wand and the center 218.a of the end section of the brush, so as to align the center 218.b of the other end of the brush with the main axis X—X, like the first end 218.a.

Figure 2D:
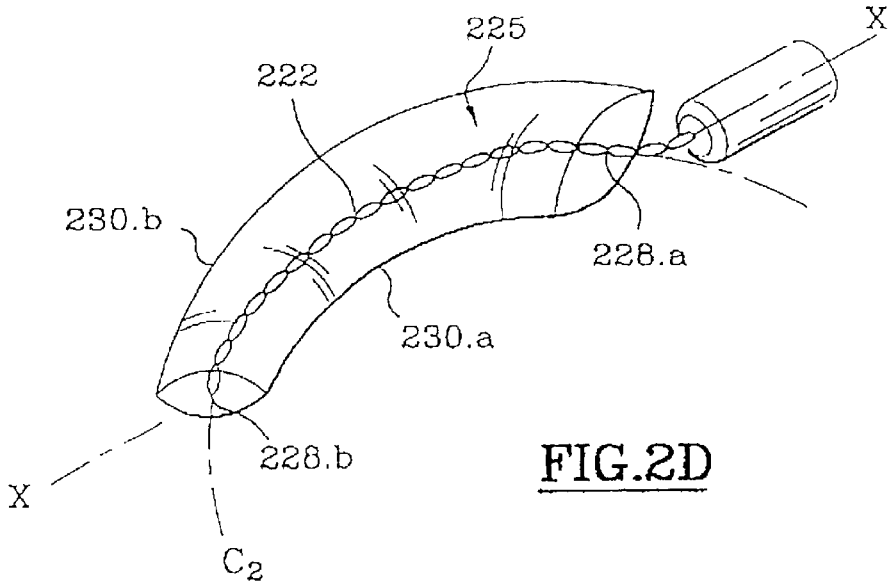

This operation yields a brush 200 according to the invention and depicted in FIG. 2D. In this Figure, the references given to elements that are similar to those in FIGS. 2B and 2C are those of FIGS. 2B and 2C increased by 10.

The brush in FIG. 2D is more or less in the shape of a sickle; the core 222 describes a curve $C_2$ which is more or less an arc of a circle. However, its ends 228.a and 228.b are aligned with the main axis X—X. The surface 225 of the brush comprises two faces 229a, 229b. These two faces are joined by two more or less circular ridges 230a, 230b. The surface 225 of the brush is generated by a series of curves 215 as depicted in FIG. 2C, which progress along the core 222; these curves are more or less eye-shaped, with their axis of greatest length (Z—Z) mutually parallel.

Figure 3A:
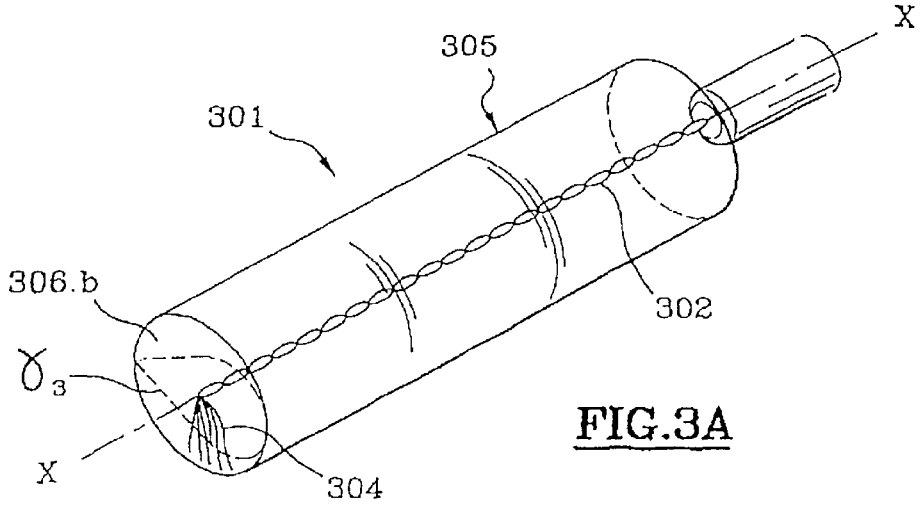

For elements of FIG. 3A which are common to FIG. 1A, the references given to elements similar to those in FIG. 1A are those of FIG. 1A increased by 200.

FIG. 3A can be differentiated from FIG. 1A by the fact that the intersection ($\gamma_3$) of a cross section, here the end section 306b of the surface 305 of the brush with the trimming plane, has the shape of a teardrop.

Using a trimmer, two secant rounded faces are cut in the brush of FIG. 3A along the entire length (measured along the axis X—X) of the brush following the curve ($\gamma_3$). This yields a trimmed brush depicted in FIGS. 3B and 3C.

Figure 3B:
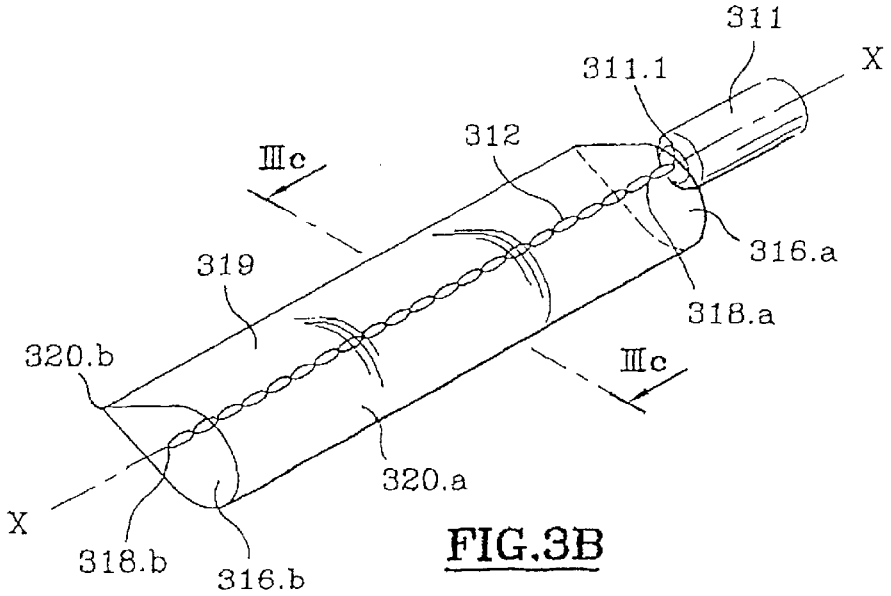
Figure 3C:
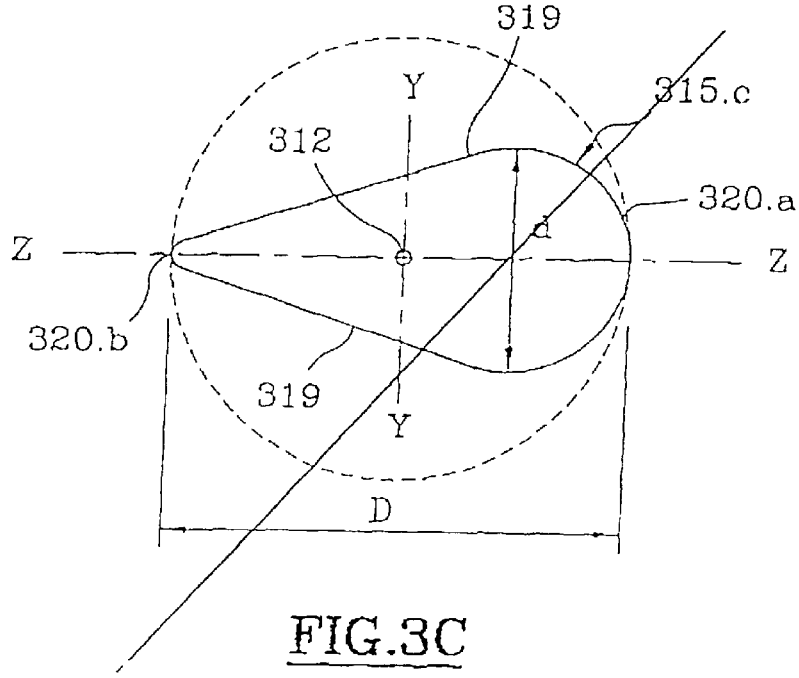

For elements of FIGS. 3B and 3C which are common to FIG. 3A, the references in FIGS. 3B and 3C are the same as those in FIG. 3A, increased by 10.

The brush depicted in FIGS. 3B and 3C has two rounded and secant faces 319. These two faces are symmetric with respect to the plane passing through the core 312 and containing the axis of greatest length Z—Z. The distance d between the extremes of the two faces is more or less constant from one end of the brush to the other. The two faces are joined by edges 320a which is rounded, and 320b which is a ridge. The sections of the brush on a plane perpendicular to X—X consist of curves 315c, depicted in FIG. 3C, which are more or less teardrop shaped, with the longest length D along the axis Z—Z of greatest length ad the greatest width d measured along the axis Y—Y of greatest width. The greatest width d is not centered with respect to the greatest length D. D is constant along the axis of the core with D>2d on the curve 315c depicted in FIG. 3C. The two trimmed faces extend as far as the end sections 316a and 316b of the brush. The curve 315c is symmetric with respect to the axis (Z—Z) of greatest length but not with respect to the axis Y—Y of greatest width.

Using an appropriate tool, for example by pressing the core longitudinally around a metal cylinder, the core 312 is given a first twist in the plane parallel to the axis Z—Z and passing through the wand 311, between the sections 316.a and 316.b, in such a way that the core has more or less the shape of an arc of a circle; it is then given a second twist, in the same plane, between the end 311.1 of the wand and the center 318.a of the end section of the brush, so as to align the center 318.b of the other end of the brush with the main axis X—X, like the first end 318.a.

Figure 3D:
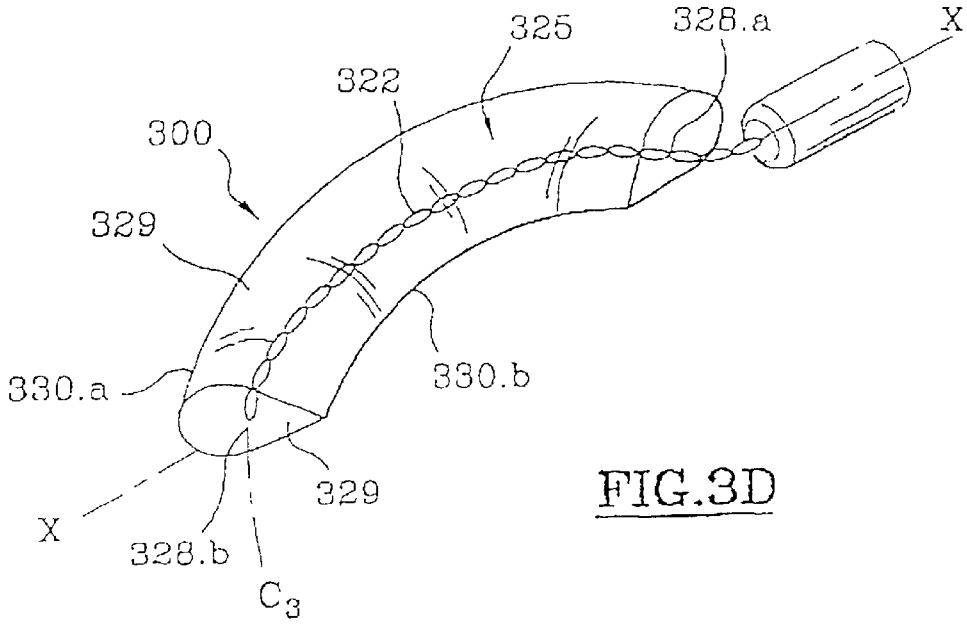

This operation yields a brush 300 according to the invention and depicted in FIG. 3D. In this Figure, the references given to elements that are similar to those in FIGS. 3B and 3C are those of FIGS. 3B and 3C increased by 10.

The brush in FIG. 3D is more or less the shape of a sickle; the core 322 describes a curve $C_3$, which is more or less an arc of a circle. However, its ends 328.a and 328.b are aligned with the main axis X—X. The surface 325 of the brush comprises two faces 329. These two faces are joined by a ridge 330b and by a rounded edge 330a which are more or less circular. The surface 325 of the brush is generated by a series of curves 315c as depicted in FIG. 3C, which progress along the core 322; these curves are more or less teardrop shaped, with their axes (Z—Z) of greatest length mutually parallel and parallel to the plane of curvature.

In the three embodiments of the invention described hereinabove, use was made of starting brushes with the shape of a rugby ball and a frustoconical shape but it is also possible to use a starting brush with a shape chosen from a cylinder, bioconical (two cones joined together by the bases of the two identically-sized cones.), a fish as descried for example in FR-A-2730910, a peanut, an obus or a teardrop.

Figure 4:
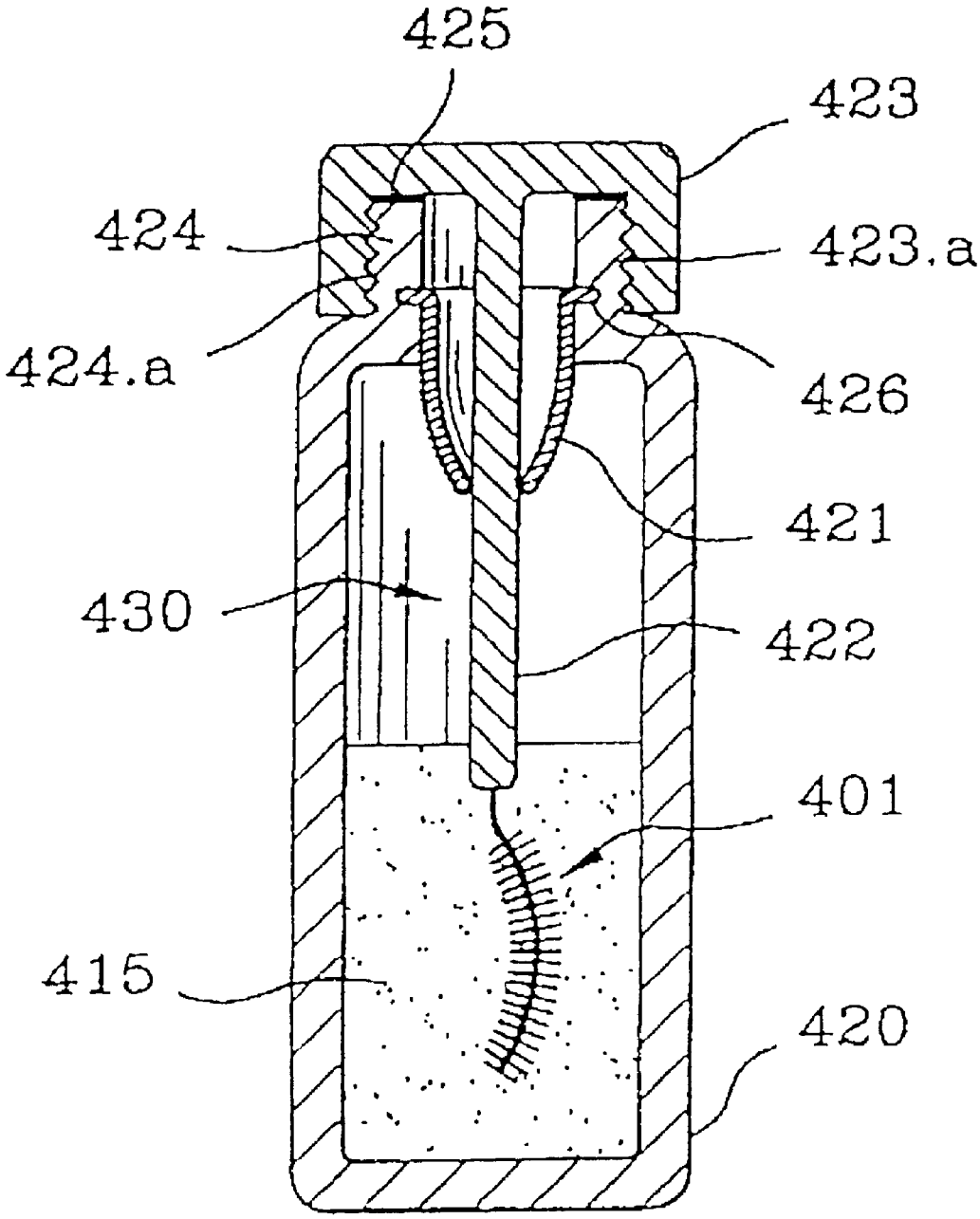
FIG. 4 is a view in section of a device for applying eye makeup.

The device for applying make-up to the eyes depicted in FIG. 4 comprises a cylindrical reservoir 420 which has a threaded neck 424 surmounted by a seal 425 and which is full of a mascara 415. In its neck, the reservoir 420 has a wringing device 421, the wringing device being held in position in the neck by a rim 426 that interacts with the shoulder separating the neck from the reservoir 420 proper. The wringing device 421 consists, in the known way, of a flexible and elastic material. An applicator is intended to interact with the reservoir 420. This applicator consists of a holding means 423 which supports the applicator member 430, comprising a wand 422 and an applicator member 401 which are identical to those depicted in FIGS. 1D or 2D. The holding means 423 is in the form of a cap and has a screw thread 423.a which interacts with the screw thread 424.a on the neck of the reservoir. The reservoir 420 can be closed and sealed by screening the means 423 holding onto the neck 424 of the reservoir provided with its seal 425.

When the applicator member 430 is pulled out of the reservoir the applicator member, which is in the form of a brush laden with mascara, passes through the wringing device 421 which wrings out the bristles on the back of the brush more than it wrings out the bristles in the hollow of the brush. The bristles on the sides of the brush are very much wrung out.

While applying the mascara to the eyelashes, the brush coats the lashes with product on both faces than spreads out the product, and lengthens and curls the lash with its back and hollow faces, and combs using its sides. As (i) the bristles on the sides are very long compared with the rest of the D bristles of the brush, as (ii) the bristles in the hollow of the brush have a shape which can adapt to the contour of the eyelid, and as (iii) the comb is not very thick, the lashes are engaged very well during this combing-out, which is very effective.

Compared with the brushes known from the prior art that are convex overall, the brush according to the invention offers the advantages of being very easy to use, of applying make-up to all of the lashes on the eyelid without overspill, and of giving a very lengthening and very curling make-up effect with good separation.

What is claimed as new and desired to be secured by Letters Patent of the United States is:

1. A brush comprising:

a wand defining a major axis (X—X);

a core having a first end and a second end, the first end being secured to the wand;

bristles [having first ends and second ends, the first ends] inserted radially into the core, [and] the [second] *bristles having* ends [of the bristles] defining an envelope surface of the brush, the envelope surface having a length, a first end, a second end, and a cross section;

The core defining a curve in a plane of curvature;

the envelope surface of the brush over at least part of its length having a cross section of elongate shape in the direction of an axis (Z—Z) of greatest length parallel to the plane of curvature.

2. A brush according to claim 1, wherein the cross section has at least two sides in the direction of the axis (Z—Z) of greatest length, these sides being substantially parallel to the axis (Z—Z).

3. A brush according to claim 2, wherein the cross section has at least two sides in the direction of [the] *an* axis (Y—Y), each side *in the direction of the axis* (*Y—Y*) having a convex shape, the axis (*Y—Y*) being perpendicular to the axis (Z—Z) of greatest length.

4. A brush according to claim 1, wherein the cross section has at least two sides in the direction of the axis (Z—Z) of greatest length, the sides having a convex shape.

5. A brush according to claim 4, wherein the sides of the cross section have two ends, a width of the cross section in the direction of [the] *an* axis (Y—Y) perpendicular to the axis (Z—Z) of greatest length at one of these ends being substantially zero.

6. A brush according to claim 5, wherein [the sides of the cross section have two ends,] the width of the *cross* section in the direction of the axis (Y—Y) perpendicular to the axis (Z—Z) of greatest length at both ends [being] *is* substantially zero.

7. A brush according to claim 4, wherein the cross section has at least two sides in the direction of [the] *an* axis (Y—Y), each side *in the direction of the axis* (*Y—Y*) having a convex shape, the axis (*Y—Y*) being perpendicular to the axis (Z—Z) of greatest length.

8. A brush according to claim 1, wherein the cross section has at least two sides in [the] *a* direction of [the] *an* axis (Y—Y), each side *in the direction of the axis* (*Y—Y*) having a convex shape, the axis (Y—Y) being perpendicular to the axis (Z—Z) of greatest length.

9. A brush according to claim 1, wherein the cross section has a maximum width (D) in the direction of the axis (Z—Z) of greatest length and a maximum width (d) in the direction of [the] *an* axis (Y—Y) *perpendicular to the axis* (*Z—Z*) *of greatest length*, D and d satisfying the relationship:

$D>1.5d$.

10. A brush according to claim 9, wherein D and d satisfy the relationship:

$D>2d$.

11. A brush according to claim 1, wherein the envelope surface has an elongate cross section over at least 50% of its length.

12. A brush according to claim 1, wherein the envelope surface has an elongate *cross* section over at least 75% of its length.

13. A brush according to claim 1, wherein the curve is substantially the shape of an arc of a circle.

14. [Brush] *A brush* according to claim 1, characterized in that the ends of the core are aligned with the axis (X—X).

15. A method of manufacturing a brush according to claim 1 comprising the steps of:

(i) producing a starting brush comprising a wand defining a major axis (X—X), a core having a first end and a second end, securing the first end of the core to the wand, the core being straight and aligned with the wand, inserting bristles radially into the core, [the end] *ends* of the bristles defining an envelope surface of the starting brush;

(ii) trimming the bristles of the starting brush in such a way that the envelope surface of the brush over at least part of its length has a cross section of elongate shape in the direction of an axis (Z—Z) of greatest length; and (iii) twisting the core in [the] *a* plane parallel to the axis (Z—Z) of greatest length and passing through the wand.

16. A method according to claim 15, wherein the envelope surface of the starting brush is one of: a cylinder and a part of a cone.

17. A method according to claim 15, wherein the envelope surface of the starting brush is convex.

18. A method according to claim 15, wherein the envelope surface of the starting brush is axisymmetric.

19. A method according to claim 15, further comprising the step of giving a secondary twist to that end of the core which is secured to the wand so as to align the second end of the core with the [main] *major* axis (X—X).

20. A make-up device comprising a mascara reservoir and a mascara-applicator member, characterized in that the applicator member is a brush according to claim 1.

*21. A brush according to claim 1, wherein the bristles comprise first and second ends defining the envelope surface of the brush.*

*22. A brush according to claim 21, wherein each of the bristles comprises a portion between the first and second bristle ends, wherein the core holds the portion.*

*23. A brush according to claim 1, wherein the bristles comprise short bristles and long bristles, and wherein ends of the long bristles define the envelope surface of the brush.*

*24. A brush according to claim 1, wherein the core comprises first and second branches, the first and second branches being helically twisted and holding bristles between the branches.*

*25. A brush for applying a cosmetic product, the brush comprising:*

*a core comprising a first end and a second end; and*

*bristles extending radially from the core, the bristles comprising ends defining an envelope surface of the brush, the envelope surface comprising a length, a first end, and a second end,*

*wherein the core defines a curve,*

*wherein the envelope surface over at least part of its length has a cross section having an elongate shape,*

*wherein the curve defined by the core is in a plane of curvature, and*

*wherein the cross section is elongated in a direction substantially parallel to the plane of curvature.*

*26. A brush for applying a cosmetic product, the brush comprising:*

*a core comprising a first end and a second end; and*

*bristles extending radially from the core, the bristles comprising ends defining an envelope surface of the brush, the envelope surface comprising a length, a first end, and a second end,*

*wherein the core defines a curve,*

*wherein the envelope surface over at least part of its length has a cross section having an elongate shape,*

*wherein the curve defined by the core is in a plane of curvature, and*

*wherein the bristles comprise first bristles extending substantially parallel to the plane of curvature and second bristles extending substantially perpendicular to the plane of curvature, the first bristles being longer than the second bristles.*

*27. A brush for applying a cosmetic product, the brush comprising:*

*a core comprising a first end and a second end; and*

*bristles extending radially from the core, the bristles comprising ends defining an envelope surface of the brush, the envelope surface comprising a length, a first end, and a second end,*

*wherein the core defines a curve,*

*wherein the envelope surface over at least part of its length has a cross section having an elongate shape, and*

*wherein the curve defined by the core is in a plane of curvature, and*

*wherein the cross section has a first width dimension in a first plane parallel to the plane of curvature and a second width dimension in second plane perpendicular to the first plane, wherein the first width dimension is greater than the second width dimension.*

*28. The brush of claim 27, wherein the first width dimension is the maximum width dimension of the cross-section.*

*29. The brush of claim 27, wherein the first width dimension is greater than 1.5 times the second width dimension.*

*30. The brush of claim 27, wherein the first width dimension is greater than 2 times the second width dimension.*

*31. The brush of claim 27, wherein the bristles extend from a portion of the core defining the curve.*

*32. The brush of claim 27, further comprising a wand associated with the core.*

*33. The brush of claim 32, wherein the first end of the core is secured to the wand.*

*34. The brush of claim 33, wherein the wand defines an axis (X—X) and wherein the first and second ends of the core are aligned with the axis (X—X) defined by the wand.*

*35. The brush of claim 27, wherein the envelope surface has an elongate cross section over at least 50% of its length.*

*36. The brush of claim 27, wherein the envelope surface has an elongate cross section over at least 75% of its length.*

*37. The brush of claim 27, wherein the curve is substantially the shape of an arc of a circle.*

*38. The brush of claim 27, wherein the bristles comprise first and second ends defining the envelope surface of the brush.*

*39. The brush of claim 38, wherein each of the bristles comprises a portion between the first and second bristle ends, wherein the core holds the portion.*

*40. The brush of claim 27, wherein the bristles comprise short bristles and long bristles, wherein ends of the long bristles define the envelope surface of the brush.*

*41. The brush of claim 27, wherein the core comprises first and second branches, the first and second branches being helically twisted and holding bristles between the branches.*

*42. The brush of claim 27, wherein the brush is configured in the form of a mascara brush.*

43. A cosmetic device comprising:

the brush of claim 27; and a reservoir containing a cosmetic product.

44. The cosmetic device of claim 43, wherein the brush is configured in the form of a mascara brush and the cosmetic product comprises mascara.

45. The cosmetic device of claim 43, further comprising a wringing device associated with the reservoir.

46. The cosmetic device of claim 43, wherein the reservoir is configured to removably receive the brush.

47. The cosmetic device of claim 43, wherein the brush further comprises a wand extending from a cap configured to be connected to the reservoir, the wand being secured to the core.

48. A brush for applying a cosmetic product, the brush comprising:

a core comprising a first end and a second end; and bristles extending radially from the core, the bristles comprising ends defining an envelope surface of the brush, the envelope surface comprising a length, a first end, and a second end, wherein the core defines a curve, wherein the envelope surface over at least part of its length has a cross section having an elongate shape, wherein the curve defined by the core is in a plane of curvature, and wherein the cross section is elongated in the direction of an axis (Z—Z) of greatest length parallel to the plane of curvature.

49. The brush of claim 48, wherein the cross section has at least two sides in the direction of the axis (Z—Z) of greatest length, the at least two sides being substantially parallel to the axis (Z—Z).

50. The brush of claim 49, wherein the cross section has at least two sides in the direction of an axis (Y—Y) perpendicular to the axis (Z—Z) of greatest length, each of the at least two sides in the direction of the axis (Y—Y) having a convex shape.

51. The brush of claim 48, wherein the cross section has at least two sides in the direction of the axis (Z—Z) of greatest length, each of the at least two sides having a convex shape.

52. The brush of claim 51, wherein the at least two sides of the cross section have two ends, a width of the cross section in the direction of an axis (Y—Y) perpendicular to the axis (Z—Z) of greatest length at one of the two ends being substantially zero.

53. The brush of claim 52, wherein the width of the cross section in the direction of the axis (Y—Y) perpendicular to the axis (Z—Z) of greatest length at both of the two ends is substantially zero.

54. The brush of claim 51, wherein the cross section has at least two sides in the direction of an axis (Y—Y) perpendicular to the axis (Z—Z) of greatest length, each of the at least two sides in the direction of the axis (Y—Y) having a convex shape.

55. The brush of claim 48, wherein the cross section has at least two sides in a direction of an axis (Y—Y) perpendicular to the axis (Z—Z) of greatest length, each of the at least two sides in the direction of the axis (Y—Y) having a convex shape.

56. The brush of claim 48, wherein the cross section has a maximum width (D) in the direction of the axis (Z—Z) of greatest length and a maximum width (d) in the direction of an axis (Y—Y) perpendicular to the axis (Z—Z) of greatest length, D and d satisfying the relationship:

$D>1.5d$.

57. The brush of claim 56, wherein D and d satisfy the relationship;

$D>2d$.

58. A method of manufacturing a brush, comprising:

providing a starting brush comprising a core comprising a first end and a second end, and bristles extending radially from the core, the bristles comprising ends defining a starting brush envelope surface;

trimming the bristles so that the ends of the bristles define a trimmed envelope surface having over at least part of its length a cross section having an elongate shape; and twisting the core to form a curve in the core, wherein the twisting forms the curve in a plane of curvature, and wherein the cross section is elongated in a direction substantially parallel to the plane of curvature.

59. A method of manufacturing a brush, comprising:

providing a starting brush comprising a core comprising a first end and a second end, and bristles extending radially from the core, the bristles comprising ends defining a starting brush envelope surface;

trimming the bristles so that the ends of the bristles define a trimmed envelope surface having over at least part of its length a cross section having an elongate shape; and twisting the core to form a curve in the core, wherein the twisting forms the curve in a plane of curvature, and wherein the trimming forms first bristles and second bristles shorter than the first bristles, and wherein the first bristles extend substantially parallel to the plane of curvature and the second bristles extend substantially perpendicular to the plane of curvature.

60. A method of manufacturing a brush, comprising:

providing a starting brush comprising a core comprising a first end and a second end, and bristles extending radially from the core, the bristles comprising ends defining a starting brush envelope surface;

trimming the bristles so that the ends of the bristles define a trimmed envelope surface having over at least part of its length a cross section having an elongate shape; and twisting the core to form a curve in the core, wherein the twisting forms the curve in a plane of curvature, and wherein the cross section has a first width dimension in a first plane parallel to the plane of curvature and a second width dimension in second plane perpendicular to the first plane, wherein the first width dimension is greater than the second width dimension.

61. The method of claim 60, wherein the starting brush comprises a wand.

62. The method of claim 60, wherein the method further comprises producing the starting brush.

63. The method of claim 62, wherein the producing of the starting brush comprises inserting the bristles between a pair of branches, twisting the branches to hold the bristles between the branches, and securing the first end of the core to a wand.

64. The method of claim 60, wherein the core of the starting brush is straight.

65. The method of claim 60, wherein the first width dimension is the maximum width dimension of the cross-section.

66. The method of claim 60, wherein the starting brush comprises a wand secured to the core, wherein the core of the starting brush is straight and aligned with the wand.

*67. The method of claim 60, wherein the bristles trimmed in the trimming comprise bristles of the starting brush.*

*68. The method of claim 60, wherein the starting brush envelope surface is chosen from a cylinder and a part of a cone.*

*69. The method of claim 60, wherein the starting brush envelope surface is convex.*

*70. The method of claim 60, wherein the starting brush envelope surface is axisymmetric.*

*71. The method of claim 60, wherein the trimmed envelope surface over said at least a part of its length is non-symmetric about the core.*

*72. The method of claim 60, wherein the starting brush comprises a wand secured to the first end of the core, the wand having a major axis (X—X), and wherein the method further comprises making a secondary twist in an end portion of the core including the first end of the core so as to align the second end of the core with the major axis (X—X).*

*73. The method of claim 60, wherein the curve is substantially the shape of an arc of a circle.*

*74. The method of claim 60, wherein the trimming occurs before the twisting.*

*75. A brush for applying a cosmetic product, wherein the brush is manufactured according to the method of claim 60.*

*76. A cosmetic device comprising:*

*the brush of claim 75; and*

*a reservoir containing a cosmetic product.*

*77. The cosmetic device of claim 76, wherein the brush is configured in the form of a mascara brush, and wherein the cosmetic product comprises mascara.*

*78. A method of manufacturing a brush, comprising:*

*providing a starting brush comprising a core comprising a first end and a second end, and bristles extending radially from the core, the bristles comprising ends defining a starting brush envelope surface;*

*trimming the bristles so that the ends of the bristles define a trimmed envelope surface having over at least part of its length a cross section having an elongate shape; and*

*twisting the core to form a curve in the core,*

*wherein the twisting forms the curve in a plane of curvature, and*

*wherein the cross section is elongated in a direction substantially parallel to the plane of curvature, and,*

*wherein the cross section is elongated in the direction of an axis (Z—Z) of greatest length parallel to the plane of curvature.*

*79. A brush for applying a cosmetic product, the brush comprising:*

*a wand;*

*a core on an end of the wand; and*

*bristles extending radially from the core, the bristles comprising ends defining an envelope surface of the brush, the envelope surface comprising a length, a first end, and a second end,*

*wherein the core defines a curve in a plane of curvature, and*

*wherein the envelope surface over at least part of its length has a cross section having an elongate shape, the cross section being elongated in a direction substantially parallel to the plane of curvature.*

*80. A brush for applying a cosmetic product, the brush comprising:*

*a wand;*

*a core on an end of the wand; and*

*bristles extending radially from the core, the bristles comprising ends defining an envelope surface of the brush, the envelope surface comprising a length, a first end, and a second end,*

*wherein the core defines a curve in a plane of curvature,*

*wherein the envelope surface over at least part of its length has a cross section having an elongate shape, and*

*wherein the bristles comprise first bristles extending substantially parallel to the plane of curvature and second bristles extending substantially perpendicular to the plane of curvature, the first bristles being longer than the second bristles.*

*81. A brush for applying a cosmetic product, the brush comprising:*

*a wand;*

*a core on an end of the wand; and*

*bristles extending radially from the core, the bristles comprising ends defining an envelope surface of the brush, the envelope surface comprising a length, a first end, and a second end,*

*wherein the core defines a curve in a plane of curvature, and*

*wherein the envelope surface over at least part of its length has a cross section having an elongate shape, the cross section having a first width dimension in a first plane parallel to the plane of curvature and a second width dimension in second plane perpendicular to the first plane, the first width dimension being greater than the second width dimension.*

*82. A brush for applying a cosmetic product, the brush comprising:*

*a core having first and second ends; and*

*bristles extending radially from the core, the bristles comprising ends defining an envelope surface of the brush, the envelope surface comprising a length, a first end, and a second end,*

*wherein the core defines a curve in a plane of curvature, and*

*wherein the envelope surface over at least part of its length has a cross section having a first width dimension in a first plane parallel to the plane of curvature and a second width dimension in a second plane perpendicular to the first plane, the first width dimension being greater than the second width dimension.*

*83. The brush of claim 82, wherein the cross section is elongated in a direction substantially parallel to the plane of curvature.*

*84. The brush of claim 82, wherein the bristles comprise first bristles extending substantially parallel to the plane of curvature and second bristles extending substantially perpendicular to the plane of curvature, the first bristles being longer than the second bristles.*

*85. The brush of claim 82, wherein the first width dimension is the maximum width dimension of the cross-section.*

*86. The brush of claim 82, wherein the first width dimension is greater than 1.5 times the second width dimension.*

*87. The brush of claim 82, wherein the first width dimension is greater than 2 times the second width dimension.*

*88. The brush of claim 82, wherein the bristles extend from a portion of the core defining the curve.*

*89. The brush of claim 82, further comprising a wand associated with the core.*

*90. The brush of claim 89, wherein the first end of the core is secured to the wand.*

*91. The brush of claim 90, wherein the wand defines an axis (X—X) and wherein the first and second ends of the core are aligned with the axis (X—X) defined by the wand.*

*92. The brush of claim 82, wherein the cross section is elongated in the direction of an axis (Z—Z) of greatest length parallel to the plane of curvature.*

*93. The brush of claim 92, wherein the cross section has at least two sides in the direction of the axis (Z—Z) of greatest length, the at least two sides being substantially parallel to the axis (Z—Z).*

*94. The brush of claim 93, wherein the cross section has at least two sides in the direction of an axis (Y—Y) perpendicular to the axis (Z—Z) of greatest length, each of the at least two sides in the direction of the axis (Y—Y) having a convex shape.*

*95. The brush of claim 92, wherein the cross section has at least two sides in the direction of the axis (Z—Z) of greatest length, each of the at least two sides having a convex shape.*

*96. The brush of claim 95, wherein the at least two sides of the cross section have two ends, a width of the cross section in the direction of an axis (Y—Y) perpendicular to the axis (Z—Z) of greatest length at one of the two ends being substantially zero.*

*97. The brush of claim 96, wherein the width of the cross section in the direction of the axis (Y—Y) perpendicular to the axis (Z—Z) of greatest length at both of the two ends is substantially zero.*

*98. The brush of claim 95, wherein the cross section has at least two sides in the direction of an axis (Y—Y) perpendicular to the axis (Z—Z) of greatest length, each of the at least two sides in the direction of the axis (Y—Y) having a convex shape.*

*99. The brush of claim 92, wherein the cross section has at least two sides in a direction of an axis (Y—Y) perpendicular to the axis (Z—Z) of greatest length, each of the at least two sides in the direction of the axis (Y—Y) having a convex shape.*

*100. The brush of claim 92, wherein the cross section has a maximum width (D) in the direction of the axis (Z—Z) of greatest length and a maximum width (d) in the direction of an axis (Y—Y) perpendicular to the axis (Z—Z) of greatest length, D and d satisfying the relationship:*

$D>1.5d$.

*101. The brush of claim 100, wherein D and d satisfy the relationship:*

$D>2d$.

*102. The brush of claim 82, wherein the envelope surface has an elongate cross section over at least 50% of its length.*

*103. The brush of claim 82, wherein the envelope surface has an elongate cross section over at least 75% of its length.*

*104. The brush of claim 82, wherein the curve is substantially the shape of an arc of a circle.*

*105. The brush of claim 82, wherein the bristles comprise first and second ends defining the envelope surface of the brush.*

*106. The brush of claim 105, wherein each of the bristles comprises a portion between the first and second bristle ends, wherein the core holds the portion.*

*107. The brush of claim 82, wherein the bristles comprise short bristles and long bristles, wherein ends of the long bristles define the envelope surface of the brush.*

*108. The brush of claim 82, wherein the core comprises first and second branches, the first and second branches being helically twisted and holding bristles between the branches.*

*109. The brush of claim 82, wherein the brush is configured in the form of a mascara brush.*

*110. A cosmetic device comprising:*

*the brush of claim 82; and*

*a reservoir containing a cosmetic product.*

*111. The cosmetic device of claim 110, wherein the brush is configured in the form of a mascara brush and the cosmetic product comprises mascara.*

*112. The cosmetic device of claim 110, further comprising a wringing device associated with the reservoir.*

*113. The cosmetic device of claim 110, wherein the reservoir is configured to removably receive the brush.*

*114. The cosmetic device of claim 110, wherein the brush further comprises a wand extending from a cap configured to be connected to the reservoir, the wand being secured to the core.*

*115. A brush for applying a cosmetic product, the brush comprising:*

*a wand;*

*a core on an end of the wand; and*

*bristles extending radially from the core, the bristles comprising ends defining an envelope surface of the brush, the envelope surface comprising a length, a first end, and a second end,*

*wherein the core defines a curve in a plane of curvature, and*

*wherein the envelope surface over at least part of its length has a cross section having an elongate shape in the direction of an axis (Z—Z) of greatest length parallel to the plane of curvature.*

*116. A brush for applying a cosmetic product, the brush comprising:*

*a core having a first end and a second end; and*

*bristles extending radially from the core, the bristles comprising ends defining an envelope surface of the brush, the envelope surface comprising a length, a first end, a second end, and a cross section,*

*wherein the core defines a curve in a plane of curvature, the curve having a concave side and a convex side,*

*wherein over at least a part of the length of the envelope surface,*

*a) in the plane of curvature, the envelope surface is spaced a first distance from the concave side of the curve defined by the core, and*

*b) in a plane perpendicular to the plane of curvature, the envelope surface is spaced a second distance from the core, and*

*wherein the first distance is greater than the second distance.*

*117. The brush of claim 116, wherein the envelope surface is spaced a third distance from the convex side of the curve defined by the core, wherein the third distance is greater than the second distance.*

*118. The brush of claim 117, wherein the third distance equals the first distance.*

*119. The brush of claim 116, wherein over said at least a part of the length of the envelope surface, in the plane perpendicular to the plane of curvature, the core is positioned between first and second portions of the envelope surface, and wherein the second distance is a distance from the first portion of the envelope surface to the core.*

*120. The brush of claim 119, wherein the distance from the second portion of the envelope surface to the core is equal to the second distance.*

*121. The brush of claim 116, wherein over said at least a part of the length of the envelope surface, the cross-section of the envelope surface has an elongate shape.*

*122. The brush of claim 121, wherein the cross section is elongated in a direction substantially parallel to the plane of curvature.*

*123. The brush of claim 116, wherein the bristles comprise first bristles extending substantially parallel to the plane of curvature and second bristles extending substantially perpendicular to the plane of curvature, the first bristles being longer than the second bristles.*

*124. The brush of claim 116, wherein over said at least a part of the length of the envelope surface, the cross section of the envelope surface has a first width dimension in a first plane parallel to the plane of curvature and a second width dimension in second plane perpendicular to the first plane, the first width dimension being greater than the second width dimension.*

*125. The brush of claim 124, wherein the first width dimension is the maximum width dimension of the cross-section.*

*126. The brush of claim 124, wherein the first width dimension is greater than 1.5 times the second width dimension.*

*127. The brush of claim 124, wherein the first width dimension is greater than 2 times the second width dimension.*

*128. The brush of claim 116, wherein the bristles extend from a portion of the core defining the curve.*

*129. The brush of claim 116, further comprising a wand associated with the core.*

*130. The brush of claim 129, wherein the first end of the core is secured to the wand.*

*131. The brush of claim 130, wherein the wand defines an axis (X—X) and wherein the first and second ends of the core are aligned with the axis (X—X) defined by the wand.*

*132. The brush of claim 116, wherein the cross section is non-symmetric about the core.*

*133. The brush of claim 116, wherein the cross section is elongated in the direction of an axis (Z—Z) of greatest length parallel to the plane of curvature.*

*134. The brush of claim 133, wherein the cross section has at least two sides in the direction of the axis (Z—Z) of greatest length, the at least two sides being substantially parallel to the axis (Z—Z).*

*135. The brush of claim 134, wherein the cross section has at least two sides in the direction of an axis (Y—Y) perpendicular to the axis (Z—Z) of greatest length, each of the at least two sides in the direction of the axis (Y—Y) having a convex shape.*

*136. The brush of claim 133, wherein the cross section has at least two sides in the direction of the axis (Z—Z) of greatest length, each of the at least two sides having a convex shape.*

*137. The brush of claim 136, wherein the at least two sides of the cross section have two ends, a width of the cross section in the direction of an axis (Y—Y) perpendicular to the axis (Z—Z) of greatest length at one of the two ends being substantially zero.*

*138. The brush of claim 137, wherein the width of the cross section in the direction of the axis (Y—Y) perpendicular to the axis (Z—Z) of greatest length at both of the two ends is substantially zero.*

*139. The brush of claim 136, wherein the cross section has at least two sides in the direction of an axis (Y—Y) perpendicular to the axis (Z—Z) of greatest length, each of the at least two sides in the direction of the axis (Y—Y) having a convex shape.*

*140. The brush of claim 133, wherein the cross section has at least two sides in a direction of an axis (Y—Y) perpendicular to the axis (Z—Z) of greatest length, each of the at least two sides in the direction of the axis (Y—Y) having a convex shape.*

*141. The brush of claim 133, wherein the cross section has a maximum width (D) in the direction of the axis (Z—Z) of greatest length and a maximum width (d) in the direction of an axis (Y—Y) perpendicular to the axis (Z—Z) of greatest length, D and d satisfying the relationship:*

*D>1.5d.*

*142. The brush of claim 141, wherein D and d satisfy the relationship:*

*D>2d.*

*143. The brush of claim 116, wherein the envelope surface has an elongate cross section over at least 50% of its length.*

*144. The brush of claim 116, wherein the envelope surface has an elongate cross section over at least 75*

*of its length.*

*145. The brush of claim 116, wherein the curve is substantially the shape of an arc of a circle.*

*146. The brush of claim 116, wherein the bristles comprise first and second ends defining the envelope surface of the brush.*

*147. The brush of claim 116, wherein each of the bristles comprises a portion between the first and second bristle ends, wherein the core holds the portion.*

*148. The brush of claim 116, wherein the bristles comprise short bristles and long bristles, wherein ends of the long bristles define the envelope surface of the brush.*

*149. The brush of claim 116, wherein the core comprises first and second branches, the first and second branches being helically twisted and holding bristles between the branches.*

*150. The brush of claim 116, wherein the brush is configured in the form of a mascara brush.*

*151. A cosmetic device comprising:*

*the brush of claim 116; and*

*a reservoir containing a cosmetic product.*

*152. The cosmetic device of claim 151, wherein the brush is configured in the form of a mascara brush and the cosmetic product comprises mascara.*

*153. The cosmetic device of claim 151, further comprising a wringing device associated with the reservoir.*

*154. The cosmetic device of claim 151, wherein the reservoir is configured to removably receive the brush.*

*155. The cosmetic device of claim 151, wherein the brush further comprises a wand extending from a cap configured to be connected to the reservoir, the wand being secured to the core.*

*156. A brush for applying a cosmetic product, the brush comprising:*

*a core having a first end and a second end; and*

*bristles extending radially from the core, the bristles comprising ends defining an envelope surface of the brush, the envelope surface comprising a length, a first end, a second end, and a cross section,*

*wherein the core defines a curve in a plane of curvature, the curve having a concave side and a convex side, and*

*wherein over at least a part of the length of the envelope surface,*

*a) in a plane parallel to the plane of curvature, the envelope surface is spaced a first distance from the convex side of the curve defined by the core, and*

*b) in a plane perpendicular to the plane of curvature, the envelope surface is spaced a second distance from the core, and*

*wherein the first distance is greater than the second distance.*

*157. The brush of claim 156, wherein over said at least a part of the length of the envelope surface, in the plane perpendicular to the plane of curvature, the core is positioned between first and second portions of the envelope surface, wherein the second distance is a distance from the first portion of the envelope surface to the core.*

*158. The brush of claim 157, wherein the distance from the second portion of the envelope surface to the core is equal to the second distance.*

*159. The brush of claim 156, wherein over said at least a part of the length of the envelope surface, the cross-section of the envelope surface has an elongate shape.*

*160. The brush of claim 159, wherein the cross section is elongated in a direction substantially parallel to the plane of curvature.*

*161. The brush of claim 156, wherein the bristles comprise first bristles extending substantially parallel to the plane of curvature and second bristles extending substantially perpendicular to the plane of curvature, the first bristles being longer than the second bristles.*

*162. The brush of claim 156, wherein over said at least a part of the length of the envelope surface, the cross section of the envelope surface has a first width dimension in a first plane parallel to the plane of curvature and a second width dimension in second plane perpendicular to the first plane, the first width dimension being greater than the second width dimension.*

*163. The brush of claim 156, wherein the bristles extend from a portion of the core defining the curve.*

*164. The brush of claim 156, further comprising a wand associated with the core.*

*165. The brush of claim 164, wherein the first end of the core is secured to the wand.*

*166. The brush of claim 156, wherein the cross section is elongated in the direction of an axis (Z—Z) of greatest length parallel to the plane of curvature.*

*167. The brush of claim 156, wherein the envelope surface has an elongate cross section over at least 50% of its length.*

*168. The brush of claim 156, wherein the envelope surface has an elongate cross section over at least 75% of its length.*

*169. The brush of claim 156, wherein the curve is substantially the shape of an arc of a circle.*

*170. The brush of claim 156, wherein the core comprises first and second branches, the first and second branches being helically twisted and holding bristles between the branches.*

*171. The brush of claim 156, wherein the brush is configured in the form of a mascara brush.*

*172. A cosmetic device comprising:*

*the brush of claim 156; and*

*a reservoir containing a cosmetic product.*

*173. The cosmetic device of claim 172, wherein the brush is configured in the form of a mascara brush and the cosmetic product comprises mascara.*

*174. The cosmetic device of claim 172, further comprising a wringing device associated with the reservoir.*

*175. The cosmetic device of claim 172, wherein the reservoir is configured to removably receive the brush.*

*176. The cosmetic device of claim 172, wherein the brush further comprises a wand extending from a cap configured to be connected to the reservoir, the wand being secured to the core.*

*177. A brush for applying a cosmetic product, the brush comprising:*

*a core having a first end and a second end; and*

*bristles extending radially from the core, the bristles comprising ends defining an envelope surface of the brush, the envelope surface comprising a length, a first end, a second end, and a cross section,*

*wherein the core defines a curve,*

*wherein the envelope surface over at least a part of its length is non-symmetric about the core,*

*wherein the curve defined by the core is in a plane of curvature, and*

*wherein the cross section is elongate d in a direction substantially parallel to the plane of curvature.*

*178. A brush for applying a cosmetic product, the brush comprising:*

*a core having a first end and a second end; and*

*bristles extending radially from the core, the bristles comprising ends defining an envelope surface of the brush, the envelope surface comprising a length, a first end, a second end, and a cross section,*

*wherein the core defines a curve,*

*wherein the envelope surface over at least a part of its length is non-symmetric about the core,*

*wherein the curve defined by the core is in a plane of curvature, and*

*wherein the bristles comprise first bristles extending substantially parallel to the plane of curvature and second bristles extending substantially perpendicular to the plane of curvature, the first bristles being longer than the second bristles.*

*179. A brush for applying a cosmetic product, the brush comprising:*

*a core having a first end and a second end; and*

*bristles extending radially from the core, the bristles comprising ends defining an envelope surface of the brush, the envelope surface comprising a length, a first end, a second end, and a cross section,*

*wherein the core defines a curve,*

*wherein the envelope surface over at least a part of its length is non-symmetric about the core,*

*wherein the curve defined by the core is in a plane of curvature, and*

*wherein the cross section has a first width dimension in a first plane parallel to the plane of curvature and a second width dimension in second plane perpendicular to the first plane, wherein the first width dimension is greater than the second width dimension.*

*180. The brush of claim 179, wherein over said at least a part of the length of the envelope surface, the cross-section of the envelope surface has an elongate shape.*

*181. The brush of claim 179, wherein the first width dimension is the maximum width dimension of the cross-section.*

*182. The brush of claim 179, wherein the first width dimension is greater than 1.5 times the second width dimension.*

*183. The brush of claim 179, wherein the first width dimension is greater than 2 times the second width dimension.*

*184. The brush of claim 179, wherein the bristles extend from a portion of the core defining the curve.*

*185. The brush of claim 179, further comprising a wand associated with the core.*

*186. The brush of claim 185, wherein the first end of the core is secured to the wand.*

*187. The brush of claim 186, wherein the wand defines an axis (X—X) and wherein the first and second ends of the core are aligned with the axis (X—X) defined by the wand.*

*188. The brush of claim 179, wherein the envelope surface has an elongate cross section over at least 50% of its length.*

*189. The brush of claim 179, wherein the envelope surface has an elongate cross section over at least 75% of its length.*

*190. The brush of claim 179, wherein the curve is substantially the shape of an arc of a circle.*

*191. The brush of claim 179, wherein the bristles comprise first and second ends defining the envelope surface of the brush.*

*192. The brush of claim 191, wherein each of the bristles comprises a portion between the first and second bristle ends, wherein the core holds the portion.*

*193. The brush of claim 179, wherein the bristles comprise short bristles and long bristles, wherein ends of the long bristles define the envelope surface of the brush.*

*194. The brush of claim 179, wherein the core comprises first and second branches, the first and second branches being helically twisted and holding bristles between the branches.*

*195. The brush of claim 179, wherein the brush is configured in the form of a mascara brush.*

*196. A cosmetic device comprising:*

*the brush of claim 179; and*

*a reservoir containing a cosmetic product.*

*197. The cosmetic device of claim 196, wherein the brush is configured in the form of a mascara brush and the cosmetic product comprises mascara.*

*198. The cosmetic device of claim 196, further comprising a wringing device associated with the reservoir.*

*199. The cosmetic device of claim 196, wherein the reservoir is configured to removably receive the brush.*

*200. The cosmetic device of claim 196, wherein the brush further comprises a wand extending from a cap configured to be connected to the reservoir, the wand being secured to the core.*

*201. A brush for applying a cosmetic product, the brush comprising:*

*a core having a first end and a second end; and*

*bristles extending radially from the core, the bristles comprising ends defining an envelope surface of the brush, the envelope surface comprising a length, a first end, a second end, and a cross section,*

*wherein the core defines a curve,*

*wherein the envelope surface over at least a part of its length is non-symmetric about the core,*

*wherein the curve defined by the core is in a plane of curvature, and*

*wherein the cross section is elongated in the direction of an axis (Z—Z) of greatest length parallel to the plane of curvature.*

*202. The brush of claim 201, wherein the cross section has at least two sides in the direction of the axis (Z—Z) of greatest length, each of the at least two sides having a convex shape.*

*203. The brush of claim 202, wherein the at least two sides of the cross section have two ends, a width of the cross section in the direction of an axis (Y—Y) perpendicular to the axis (Z—Z) of greatest length at one of the two ends being substantially zero.*

*204. The brush of claim 201, wherein the cross section has a maximum width (D) in the direction of the axis (Z—Z) of greatest length and a maximum width (d) in the direction of an axis (Y—Y) perpendicular to the axis (Z—Z) of greatest length, D and d satisfying the relationship:*

$D>1.5d.$

*205. The brush of claim 204, wherein D and d satisfy the relationship:*

$D>2d.$

* * * * *

UNITED STATES PATENT AND TRADEMARK OFFICE

CERTIFICATE OF CORRECTION

PATENT NO. : RE 38,397 E
DATED : January 27, 2004
INVENTOR(S) : Jean-Louis H. Gueret It is certified that error appears in the above-identified patent and that said Letters Patent is hereby corrected as shown below:

Column 8,
Line 16, please replace “The core” with -- the core --.

Column 18,
Line 16, after “75”, please insert -- % --.

Column 20,
Line 10, please replace “elongate d” with -- elongated --.

Signed and Sealed this

Eighth Day of June, 2004

JON W. DUDAS
*Acting Director of the United States Patent and Trademark Office*